March 11, 1958     J. F. SHANNON ET AL     2,826,038
GAS TURBINE PLANT WITH LIQUID AND GASEOUS FUELS
Filed Sept. 17, 1953
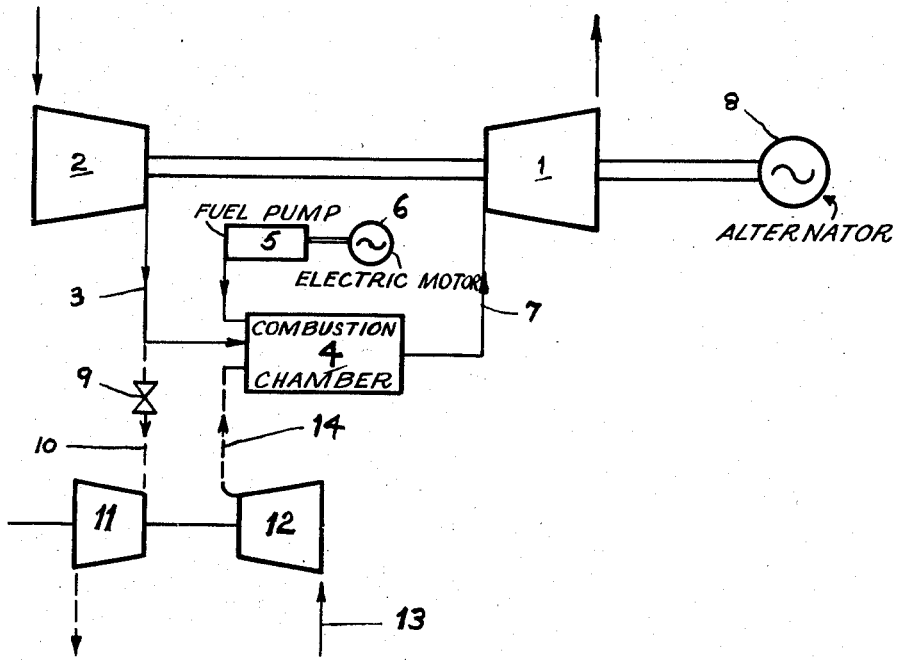
INVENTORS United States Patent Office 2,826,038
Patented Mar. 11, 1958

2,826,038
GAS TURBINE PLANT WITH LIQUID AND GASEOUS FUELS

James Forrest Shannon, Bowdon, and Harold Farrington, Stockport, England, assignors to Metropolitan-Vickers Electrical Company Limited, London, England, a British company Application September 17, 1953, Serial No. 380,782

1 Claim. (Cl. 60—39.46)

This invention relates to open-cycle gas turbine plant, be they simple or compounded, capable of being readily adapted at will to run on any one of a variety of fuels having different calorific values, without serious loss in efficiency.

In conventional open-cycle gas turbine plant the mass flow through the turbine is the sum of the mass flow of the air from the compressor and of the fuel admitted to the combustion chamber with corrections for leakages.

When running on fuel having relatively low calorific value, the mass flow through the turbine will be higher than when running on fuel having relatively high calorific value because in the former instance the low calorific value will necessitate the burning of a greater mass of fuel in order to achieve the nozzle temperature for which the turbine is designed.

Thus, if it is desired to run a given plant on any one of a variety of fuels having widely different calorific values, the problem arises of adjusting the turbine swallowing capacity, i. e. nozzle area, to accept correspondingly different quantities of gas, for, if the design performance of the turbine blading is not sufficiently flexible to accept such variations in gas flow, the efficiency of the plant will suffer in consequence of any deviation from the design basis.

It is an object of the invention to provide a plant whereby a changeover from a fuel having a high calorific value to a fuel having a low calorific value may be readily made without the need for adjusting the nozzle area and without undue loss of efficiency.

According to the invention, in open-cycle gas turbine plants of the kind comprising one or more compressors for supplying pressure air to one or more combustion chambers in which fuel is burnt for providing gaseous working fluid for one or more turbines, there are provided means for diverting a proportion of the pressure air from the combustion chamber(s) and means for converting the energy of the diverted air into useful work, whereby during the supply to the combustion chamber(s) of fuel of lower calorific value than that for which the turbine(s) is or are designed, air may be diverted from the combustion chamber(s) in proportion corresponding in mass flow to the additional mass flow of fuel necessary to achieve the desired nozzle temperature.

The plant according to the invention is eminently suitable for running alternately on liquid fuel of high calorific value and on gaseous fuel, for example blast furnace gas, of lower calorific value and according to a preferred feature the energy of the air is recovered in a regenerative turbine for aiding in the compression of the gaseous fuel.

A preferred embodiment of the invention will now be described, by way of example, with reference to the accompanying drawing, this embodiment being particularly suitable for utilizing, at will, liquid fuel of high calorific value or gaseous fuel of low calorific value.

A turbine 1 designed to run on liquid fuel of relatively high calorific value is mechanically coupled to a compressor 2. Air from the compressor is conveyed through a duct 3, in the usual way, to a combustion chamber 4, into which liquid fuel is injected such as by a fuel pump 5 driven by an electric motor 6. The gaseous combustion products are then conducted through a duct 7 to the turbine. The turbine is assumed by way of example to be coupled to an electric generator 8.

When it is desired to run the plant on a fuel having a lower calorific value than that for which the turbine is designed, for example blast furnace gas, a greater mass flow of fuel has to be provided in order to attain the desired nozzle temperature in the turbine. In order that the total mass flow through the turbine shall not be greater than that for which the turbine is designed, it is necessary to reduce the mass flow of air supplied to the combustion chamber 4 by an amount equivalent to the additional mass flow of fuel. For this purpose a controllable by-pass valve 9 is provided in a duct 10 connected with the duct 3. By opening the by-pass valve 9 some of the pressure air can be diverted to operate suitable means for converting its energy into useful work, such as, for example, an air turbine 11 which can be used to drive a power take-off shaft.

In the case of a plant designed to utilize gaseous fuel of low calorific value it is convenient to couple the air turbine 11 to a compressor 12 to which the gaseous fuel is supplied through a duct 13. The fuel after leaving the compressor 12 passes through a duct 14 to the combustion chamber 4.

Although the embodiment described above relates to the utilization of only two different fuels, it may be modified to permit the selective burning of more than two different fuels as will be evident to those skilled in the art with reference to the description herein.

What we claim is:

An open cycle gas turbine plant comprising in combination a compressor, combustion apparatus connected to be supplied with pressure air from said compressor, means for normally supplying to said combustion apparatus liquid fuel for combustion therein, means for alternatively supplying the combustion chamber with gaseous fuel for combustion therein which is of lower calorific value than the said liquid fuel, a gas turbine connected to be supplied with gaseous combustion products from said combustion apparatus to drive said air compressor and a load shaft, means for diverting from said supply of pressure air to said combustion apparatus a proportion of the pressure air delivered by the compressor, an air turbine connected to receive said diverted pressure air, and a compressor coupled to said air turbine and connected to the combustion apparatus for supplying thereto the gaseous fuel of lower calorific value.

References Cited in the file of this patent
UNITED STATES PATENTS 2,380,989   Nettel et al. _____ Aug. 7, 1945
2,612,020   Griffith _____ Sept. 30, 1952